June 22, 1971 TOHRU ITAHASHI 3,585,732
APPARATUS FOR DRYING SOLIDS
Filed May 12, 1969 2 Sheets-Sheet 1

INVENTOR
TOHRU ITAHASHI
BY
Prangley, Clayton, Mullin & Vogel
ATTYS.

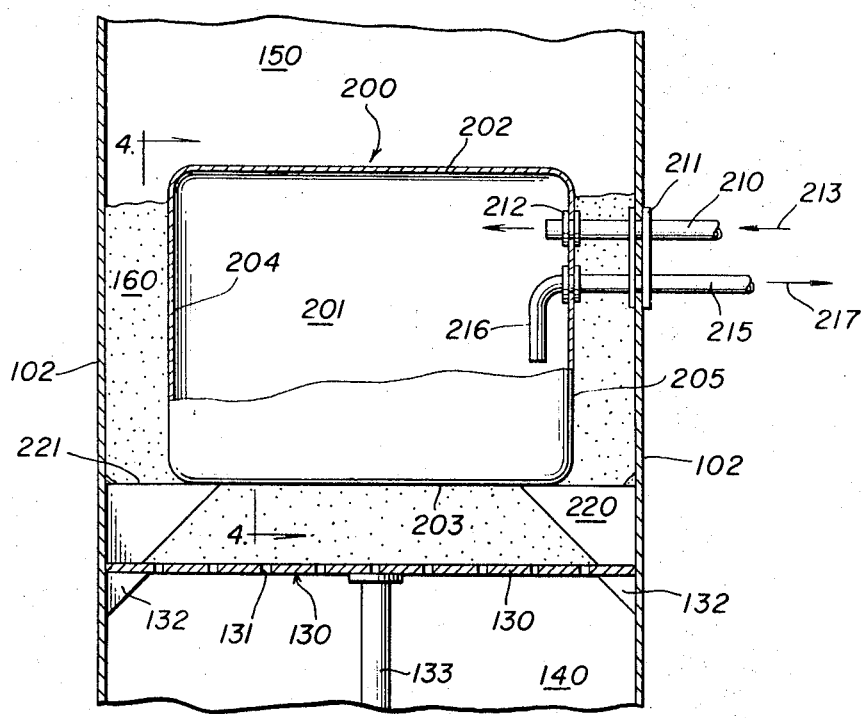
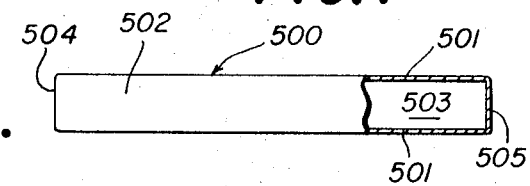
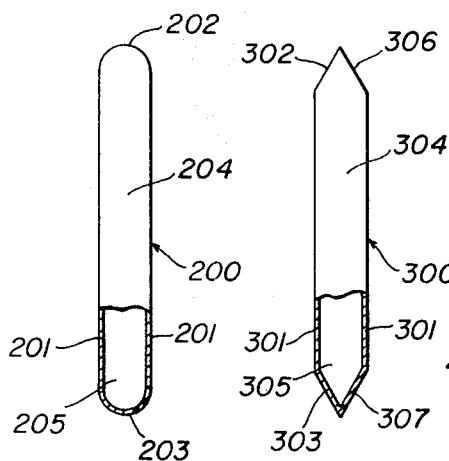
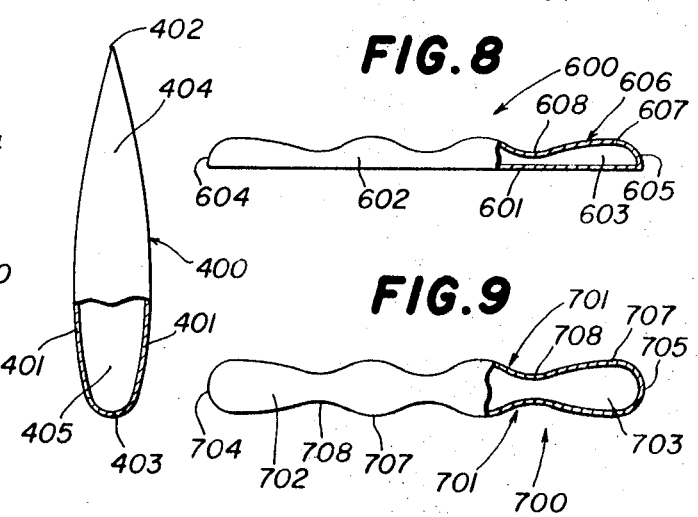

United States Patent Office 3,585,732
Patented June 22, 1971

---

3,585,732
APPARATUS FOR DRYING SOLIDS
Tohru Itahashi, Yokohama, Japan, assignor to General American Transportation Corporation, Chicago, Ill.
Filed May 12, 1969, Ser. No. 823,653
Claims priority, application Japan, May 15, 1968, 43/40,007
Int. Cl. F26b 17/10
U.S. Cl. 34—57     14 Claims

ABSTRACT OF THE DISCLOSURE

A fluidized bed-dryer with heat-exchange elements in the form of pillow-shaped envelopes having the side dimensions thereof exposed to the flow of particulate matter in the fluidized bed substantially greater than the edge dimension thereof exposed to the upward flow of fluidizing gas in the fluidized bed. The pillow-shaped envelopes are disposed in the fluidized bed at various angles with respect to the particulate matter flow path to cause the particulate matter to flow along a sinuous path. The pillow-shaped envelopes may have sinuous sides.

---

The present invention relates to apparatus for drying wet particulate matter in a fluidized bed containing pillow-shaped envelopes through which is passed a heat-exchange fluid for the drying purpose.

In many industrial processes it is necessary to remove the water content of various granular or particulate solid material before subjecting the material to further treatment or before transporting the material. This is generally accomplished by heaing the material to dry the same by evaporation of a desired amount of the moisture content of the particulate material. The heating may often be accomplished by direct heat exchange wherein the material is contacted with heated gases, such as stack gases. In other cases due to reactivity of the particulate material or the desire to avoid conamination, indirect heat exchange through a heat conducting wall is used to dry the wet particulate material.

Fluidized-bed drying is a commonly used technique for evaporating moisture from wet particulate material. Where the particulate material is a thermoplastic material such as polyvinyl chloride resin, a polyolefin resin or a polyethylene resin, the particulate materials may be contaminated by corrosive liquids from the manufacture thereof. In some cases, for example, a chloride iron concentration of more than 200 parts per million is present in the liquid entrained with thermoplastic polyvinyl chloride particulate material. In general a fluidized-bed evaporator includes a plurality of tubes welded to the walls of the dryer. A fluidized bed is established and maintained around the tube, and a heat-exchange fluid is passed through the tubes. The heat-exchange fluid heats the walls of the tubes thereby to transfer heat to the fluidized bed which surrounds the tubes. When fluidized-bed drying is applied to thermoplastic particulate material containing chloride ion concentration or other corrosive elements, the tubes carrying the heat-exchange fluid are attacked at the welds between the tube ends and the vessel wall.

Accordingly, it is an important object of the present invention to provide improved apparatus for fluidized-bed drying of thermoplastic materials.

Another object of the invention is to provide an apparatus for drying wet particulate material in a fluidized bed in which the heat-exchange elements are in the form of pillow-shaped envelopes.

A further object of the invention is to provide apparatus for drying wet particulate matter present in a fluidized bed and having a flow path through the bed in which the heat-exchange elements in the form of pillow-shaped envelopes are disposed in the fluidized bed so as to force the particulate matter to flow around the envelopes in a sinuous path.

A still further object of the invention is to provide apparatus of the type noted for drying wet particulate matter present in a fluidized bed, wherein the pillow-shaped envelopes have side dimensions thereof exposed to the flow of particulate matter in the fluidized bed substantially greater than the edge dimension thereof exposed to the upward flow of fluidizing gas in the fluidized bed.

Another object of the invention is to provide a heat-exchange element in the form of a pillow-shaped envelope having edge dimensions thereof substantially greater than the edge dimension thereof and having a surface formed by the two dimensions thereof sinuous.

The invention, both as to its organization and method of operation, together with further objects and advantages thereof, will best be understood by reference to the following specification taken in connection with the accompanying drawings in which:

FIG. 3 is a fragmentary vertical sectional view as seen along the arrows of line 3—3 of FIG. 1 and illustrating one preferred embodiment of a heat-exchange element;

FIG. 4 is an end view partly in section of the heat-exchange element shown in FIG. 3 as seen along the arrows of line 4—4 in FIG. 3;

FIG. 5 is an end view partly in section like FIG. 4 and showing a modification of the heat-exchange element of this invention;

FIG. 6 is an end view partly in section like FIG. 4 and showing another modification of the heat-exchange element of this invention;

FIG. 7 is a plan view partly in section of a modification of a heat-exchange element of this invention;

FIG. 8 is a plan view partly in section of another modification of a heat-exchange element of this invention; and FIG. 9 is a plan view partly in section of a further modification of a heat-exchange element of this invention.

Figure 1:
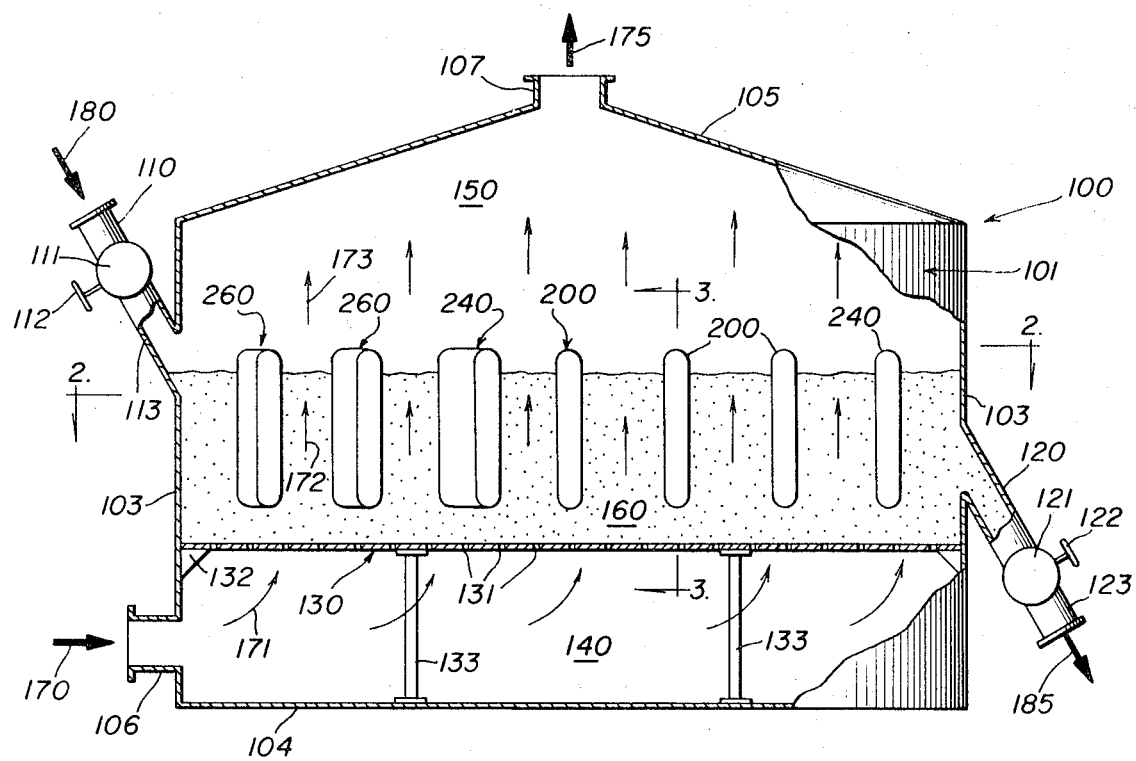
FIG. 1 is a diagrammatic and schematic illustration with certain portions in section of apparatus embodying the present invention and employed for establishing a fluidized bed of solids therein that is adapted to drying the solids.
Figure 2:
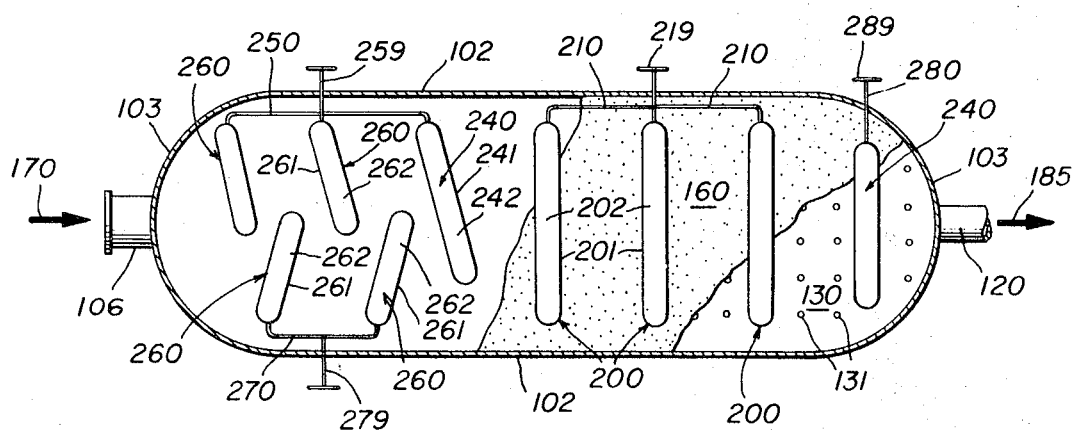
FIG. 2 is a horizontal sectional view as seen along the arrows of line 2—2 in FIG. 1, and illustrating the position of the heat-exchange elements with respect to the particulate-matter flow path.

Referring now to FIGS. 1 and 2 of the drawings, there is shown a fluidized-bed dryer 100 incorporating the improved heat-exchange elements and embodying the features of the present invention; and more specifically there is illustrated a housing 101 which is formed of two parallel spaced-apart side walls 102 connected by two semi-circular end walls 103 and joined together by bottom wall 104 and a sloping top wall 105. There is provided in the end wall 103 proximate the bottom wall 104 a fluidizing-gas inlet 106 and at the center of the sloping top wall there is provided a fluidizing-gas outlet 107.

In the end wall 103 and vertically spaced from fluidizing-gas inlet 106 there is a particulate-matter inlet pipe 110 separated from the housing 101 by a gas-tight valve 111 having a control 112 thereon and a pipe 113 communicating with the interior of the housing 101. At the other end wall 103, particulate-matter outlet pipe 120 provides communication between the interior of housing 101, a star valve 121 having control means 122 thereon and a dried-product discharge pipe 123.

In housing 101, a gas distributor plate 130 having apertures 131 therein is horizontally disposed in the housing 101 and sealed at its periphery to the parallel side walls 102 and the semi-circular end walls 103. A plurality of gussets 132 connected to the housing 101 and the periphery of the gas distributor plate 130 provide support therefor. Additional support for the gas distributor plate 130 is provided by a plurality of spaced-apart vertical poles 133 disposed between the gas distributor plate 130 and the bottom wall 104. The gas distributor plate 130 divides the housing 101 into a fluidizing-gas plenum 140 and a disengaging plenum 150. Intermediate the fluidizing-gas plenum 140 and the disengaging plenum 150 there is established and maintained a fluidizing bed 160, as will hereinafter be explained.

As shown by directional arrow 170, a fluidizing gas, such as air, is admitted through the fluidizing-gas inlet 106 into the fluidizing gas plenum 140 and flows upwardly, as shown by directional arrows 171, through the apertures 131 in the gas distributor plate 130. Solids introduced into the housing 101 through the wet particulate-matter inlet pipe 110 and valve 111, as shown by directional arrow 180, are fluidized by the fluidizing gas, as shown by arrows 172 to establish the fluidized bed 160, and the off gas from the fluidized bed exits through the fluidized-gas outlet 107 as shown by arrow 175. The dried particulate matter flows out of the fluidized bed 160 through the particulate-matter outlet pipe 120, valve 121 and dried-product discharge pipe 123 as shown by directional arrow 185. A disengagement plenum 150 above the fluidized bed 160 insures that no particulate matter entrained in the off gas from the fluidized bed 160 passes out of the housing 101 through the fluidized-gas outlet 107. Filtering means such as a screen (not shown) may be provided in the fluidizing-gas outlet 107 to prevent the loss of any particulate matter from the fluidized bed 160. As seen by the above explanation, a particulate-matter flow path is thus established from the wet particulate-matter inlet 110 to the particulate-matter outlet pipe 120.

As shown in FIGS. 1-3, there are disposed within the fluidized bed 160 a plurality of heat-exchange elements in the form of pillow-shaped envelopes 200, 240, and 260. Envelope 200 is representative and will be explained in detail; the envelope 200 includes a pair of parallel spaced-apart side walls 201, a top wall 202, a bottom wall 203 spaced apart and parallel to the top wall 202, a rear wall 204 and a front wall 205 spaced apart and parallel to the rear wall 204. The pillow-shaped envelope 200 is connected to a heat-exchange fluid inlet manifold 210 which enters the housing 101 through the side wall 102 and the envelope 200 through the front wall 205. The side wall 102 of the housing 101 and the front wall 205 of the envelope 200 are sealed by seals 211 and 212, respectively. A heat-exchange fluid, such as steam, flows into envelope 200 through the inlet manifold 210, as shown by the directional arrow 213, and contacts the various interior surfaces of the envelope 200 and flows from the envelope 200 to a heat-exchange fluid outlet manifold 215 via a standpipe 216, as shown by the directional arrow 217. The standpipe 216 is located inside the envelope 200 proximate to bottom wall 203 thereof to ensure better circulation of the heat-exchange fluid in the envelope 200. Control of the heat-exchange fluid flow to the envelope 200 is attained by manifold control 219. The envelopes 200 are supported in the housing 101 by a plurality of shelves 220 connected to side walls 102 and supporting the envelopes 200 on the upper surface 221 of the shelves 220.

As seen in the figures and illustrated by the above description, the envelopes 200 are disposed in the fluidized bed 160 and have the side dimensions thereof exposed to the flow path of the particulate matter in the fluidized bed 160 substantially greater than the edge dimension thereof exposed to the fluidized bed 160. As seen in FIG. 2, side walls 201 of envelopes 200 define planes normal to the particulate-matter flow path.

A second species of heat-exchange element is represented by pillow-shaped envelopes 240 having parallel spaced-apart side walls 241, a top wall 242, a bottom wall (not shown) and end walls. The envelopes 240 are connected to heat-exchange fluid inlet manifolds 250 and 280 which are controlled by inlet manifold controls 259 and 289, respectively. The operation of the manifolds 250 and 280 is the same as the previously explained operation of the manifold 210.

There is also shown a third species of heat-exchange element represented by a pillow-shaped envelope 260 having parallel spaced-apart side walls 261, a top wall 262, a bottom wall (not shown) and end walls. The envelopes 260 are connected to heat-exchange fluid inlet manifolds 250 and 270 which are controlled by inlet manifold controls 259 and 279, respectively. The operation of manifolds 250 and 270 is the same as the previously explained operation of the manifold 210.

As shown, certain of the pillow-shaped envelopes 240 and 260 are disposed in the fluidized bed 160 with their side walls 241 and 261, respectively, defining planes at an acute angle with respect to the particulate-matter flow path, and certain of the pillow-shaped envelopes 200 are disposed in the fluidized bed 160 with the side walls 201, thereof, defining planes normal to the particulate-matter flow path.

FIG. 4 shows a vertical transverse section of pillow-shaped envelope 200 in which the parallel spaced-apart side walls 201 are interconnected by rounded top wall 202 and bottom walls 203. While FIG. 4 shows the vertical transverse section of the heat-exchange element shown in FIG. 3 there are alternative embodiments which are shown in FIGS. 5 and 6.

FIG. 5 shows a vertical transverse section of a pillow-shaped envelope 300 including parallel spaced-apart side walls 301, inclined top walls 302 and 306 and inclined bottom walls 303 and 307. The top walls 302 and 306 meet and the inclined bottom walls 303 and 307 meet. The pillow-shaped envelope 300 also includes a rear wall 304 and a front wall 305 meeting with the side walls 301 and the top walls 302 and 306 and bottom walls 303 and 307. In use, the pillow-shaped envelope 300 is connected to a heat-exchange fluid inlet manifold and a heat-exchange outlet manifold, all as described above with respect to envelope 200.

FIG. 6 shows a vertical transverse section of a pillow-shaped envelope 400 including curved side walls 401 meeting at an apex 402 and connected by a curved bottom wall 403. The pillow-shaped envelope 400 also includes a rear wall 404 parallel to a front wall 405; the front wall 405 and rear wall 404 meet with the side walls 401 and the bottom wall 403. The vertical transverse cross section of pillow-shaped envelope 400 is teardrop in shape. In operation the pillow-shaped envelope 400 is connected to a heat-exchange fluid inlet manifold and a heat-exchange fluid outlet manifold, all as described above with respect to pillow-shaped envelope 200.

FIGS. 7 to 9 show different embodiments of the heat-exchange elements in horizontal section. FIG. 7 shows a pillow-shaped envelope 500 including parallel spaced-apart side walls 501, parallel spaced-apart top wall 502 and bottom wall 503 and parallel spaced-apart real wall 504 and front wall 505, all of said walls being interconnected to form a closed envelope. The pillow-shaped envelope 500 is rectangular in shape and in use is connected to a heat-exchange fluid inlet manifold and a heat-exchange fluid outlet manifold, all as described above with respect to envelope 200.

FIG. 8 shows a pillow-shaped envelope 600 including one straight side wall 601, parallel spaced-apart top wall 602 and bottom wall 603, generally parallel spaced-apart rear wall 604 and front wall 605 and a sinuous side wall 606 interconnected to the prior-named walls and forming a closed envelope therewith. The sinuous side wall 606 includes alternating crests 607 and troughs 608 extending the vertical length of the wall 606. In use the pillow-shaped envelope 600 is connected to a heat-exchange fluid inlet manifold and a heat-exchange fluid outlet manifold, all as described above with respect to envelope 200.

FIG. 9 shows a pillow-shaped envelope 900 including two sinuous side walls 701, parallel spaced-apart top wall 702 and bottom wall 703 and generally parallel spaced-apart rear wall 704 and front wall 705. The sinuous side walls 701 are formed of alternating crests 707 and troughs 708 extending the vertical length of the walls 701. In use, the pillow-shaped envelope 700 is connected to a heat-exchange fluid inlet manifold and a heat-exchange fluid outlet manifold, all as described above with respect to envelope 200.

In operation, fluidizing gas is admitted through the fluidizing-gas inlet 106, as shown by directional arrow 170, into the fluidizing-gas plenum 140, as shown by arrow 171, and the gas flows upwardly through apertures 131 in gas distribution plate 130 to establish and maintain a fluidized bed 160 of particulate material. The fluidized bed 160 may contain any art-recognized substance such as sand or alumina or for that matter the fluidized bed 160 may be solely formed of the wet particulate matter to be dried. The particulate matter is admitted into the housing 101 through the wet pariculate-matter inlet pipe 110 and valve 111. The valve 111 may be a star valve or a direct-flow valve if the wet particulate matter comes from a source maintained at a higher pressure than the interior of housing 101. A star valve will prevent loss of the wet particulate matter from the fluidized bed 160 due to blow-back if the source of the wet particulate matter is maintained at a lower pressure than the interior of the housing 101.

The wet particulate matter flows from the inlet pipe 110 to the outlet pipe 120. The fluidized bed 160 provides both good heat transfer between the pillow-shaped envelopes 200, 240, and 260 and the wet particulate matter and good mixing of the wet particulate matter. As the pillow-shaped envelopes 200, 240, and 260 are disposed in the fluidized bed 160 across the particulate-matter flow path with the two substantially greater dimensions thereof defining planes some of which are normal to the particulate-matter flow path and some of which are at an acute angle with respect to the particulate-matter flow path, the wet particulate matter is forced to flow in a sinuous or tortuous path around the heat-exchange elements. In this manner the pillow-shaped envelopes act both as heat-exchange elements and as baffles.

As previously stated, corrosive elements present in the fluidized bed attack the welds between the heat-exchange elements and the vessel wall. Since the pillow-shaped envelopes of the present invention rest on shelves 220, none of the envelopes are welded to the housing 101 and there is less corrosion even if the particulate matter is a thermoplastic material having entrained therewith excessive chloride ion concentration.

In view of the foregoing, it is apparent that there has been provided in a fluidized-bed dryer, an improved heat-exchange element and baffle arrangement. While there has been described what is at present considered to be the preferred embodiment of the invention it will be understood that various modifications may be made therein and it is intended to cover in the appended claims all such modifications as fall within the true spirit and scope of the invention.

What is claimed is:

1. Apparatus for drying wet particulate matter comprising a vessel, means for establishing and maintaining a fluidized bed in said vessel by passing a gas upwardly therethrough, means for admitting wet particulate matter into said vessel and into the fluidized bed therein, a plurality of pillow-shaped envelopes mounted in said vessel and disposed within the fluidized bed, said envelopes having the side dimensions thereof exposed to the flow of the particulate matter in the fluidized bed substantially greater than the edge dimensions thereof exposed to the upward flow of gas through the fluidized bed, means for passing a heat-exchange fluid through said envelopes to heat the surfaces thereof and thus to dry the particulate matter passing thereby, and means for removing dry particulate matter from the fluidized bed and out of said vessel.

2. The apparatus defined in claim 1, wherein the solid phase of the fluidized bed is the particulate matter.

3. The apparatus defined in claim 1, wherein the means for admitting wet particulate matter into said vessel and into the fluidized bed therein includes a gas-tight valve for preventing loss of the wet particulate matter from the fluidized bed due to blow-back, and the means for removing dry particulate matter from the fluidized bed and out of said vessel includes a gas-tight valve for regulating the flow of dry particulate matter from the fluidized bed.

4. The apparatus defined in claim 1, wherein certain of said pillow-shaped envelopes in vertical transverse section have two parallel spaced-apart sides and rounded ends interconnecting said sides.

5. The apparatus defined in claim 1, wherein certain of said pillow-shaped envelopes in vertical transverse section have two parallel spaced-apart sides and pointed ends interconnecting said sides.

6. The apparatus defined in claim 1, wherein certain of said pillow-shaped envelopes in vertical transverse section have a teardrop shape.

7. The apparatus defined in claim 1, wherein certain of said pillow-shaped envelopes in horizontal section have a rectangular shape.

8. The apparatus defined in claim 1, wherein certain of said pillow-shaped envelopes in horizontal section have one flat side and one sinuous side.

9. The apparatus defined in claim 1, wherein certain of said pillow-shaped envelopes in horizontal section have two sinuous sides.

10. The apparatus defined in claim 1, and further comprising a plurality of shelves fixedly mounted on the interior of said vessel and supporting said envelopes thereon.

11. An apparatus for drying wet particulate matter comprising a vessel, means for establishing and maintaining a fluidized bed in said vessel by passing a gas upwardly therethrough, inlet means for admitting wet particulate matter into said vessel and into the fluidized bed therein, outlet means for removing dry particulate matter from the fluidized bed and out of said vessel, thus to establish a flow path for the particulate matter from said inlet means to said outlet means, a plurality of pillow-shaped envelopes mounted in said vessel and disposed within the fluidized bed in said flow path, said envelopes having the side dimensions thereof substantially greater than the edge dimension thereof and defining a plane exposed to the fluidized bed and across said flow path, thereby to direct the particulate matter around said envelopes in a sinuous path, and means for passing a heat-exchange fluid through said envelopes to heat the surfaces thereof and thus to dry the particulate matter passing thereby.

12. The apparatus defined in claim 11, wherein certain of said pillow-shaped envelopes are disposed with the plane defined by said side dimensions thereof normal to said flow path.

13. The apparatus defined in claim 11, wherein certain of said pillow-shaped envelopes are disposed with the plane defined by said side dimensions thereof at an acute angle with respect to the flow path.

14. The apparatus defined in claim 11, wherein certain of said pillow-shaped envelopes are disposed with the plane defined by said side dimensions thereof normal to said flow path, and certain of said pillow-shaped envelopes are disposed with the plane defined by said side dimensions thereof at an acute angle with respect to said flow path.

References Cited

UNITED STATES PATENTS

| | | | |
|---|---|---|---|
| 2,697,653 | 12/1954 | Nicholson | 23—288.3S |
| 2,702,434 | 2/1955 | Richardson et al. | 23—288.3S.X |

FOREIGN PATENTS

| | | | |
|---|---|---|---|
| 901,947 | 11/1944 | France | 165—172 |
| 468,980 | 7/1937 | Great Britain | 165—172 |
| 693,868 | 7/1953 | Great Britain | 165—104 |

FREDERICK L. MATTESON, Jr., Primary Examiner

R. A. DUA, Assistant Examiner

U.S. Cl. X.R.

165—104